United States Patent
Bejerano et al.

(10) Patent No.: US 7,535,911 B2
(45) Date of Patent: May 19, 2009

(54) SYSTEM AND METHOD FOR DETERMINING THE PHYSICAL TOPOLOGY OF A NETWORK HAVING MULTIPLE SUBNETS

(75) Inventors: Yigal Bejerano, Springfield, NJ (US); Yuri J. Breitbart, Silver Lake, OH (US); Minos N. Garofalakis, Morristown, NJ (US); Rajeev Rastogi, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1107 days.

(21) Appl. No.: 10/445,585

(22) Filed: May 27, 2003

(65) Prior Publication Data

US 2004/0255184 A1 Dec. 16, 2004

(51) Int. Cl.
*H04L 12/28* (2006.01)
(52) U.S. Cl. .................... 370/395.31; 370/401; 370/408
(58) Field of Classification Search ................. 370/389, 370/395.3, 395.31, 395.32, 400, 401, 408, 370/411
See application file for complete search history.

(56) References Cited

U.S. PATENT DOCUMENTS

| 5,138,615 | A  | * | 8/1992 | Lamport et al. | 370/400 |
| 5,852,630 | A  | * | 12/1998 | Langberg et al. | 375/219 |
| 6,331,983 | B1 | * | 12/2001 | Haggerty et al. | 370/400 |
| 6,396,815 | B1 | * | 5/2002 | Greaves et al. | 370/256 |
| 2003/0063613 | A1 | * | 4/2003 | Carpini et al. | 370/401 |
| 2003/0086425 | A1 | * | 5/2003 | Bearden et al. | 370/392 |

* cited by examiner

*Primary Examiner*—Hassan Kizou
*Assistant Examiner*—Bo Hui A Zhu

(57) ABSTRACT

A system for, and method of, determining a physical topology of a network having multiple subnets. In one embodiment, the system includes: (1) a skeleton path initializer that uses addressing information from elements in the network to develop a collection of skeleton paths of direct physical connections between labeled ones of the elements, the skeleton paths traversing multiple of the subnets and (2) a skeleton path refiner, coupled to the skeleton path initializer, that refines the collection by inferring, from the direct physical connections and path constraints derived therefrom, other physical connections in the skeleton paths involving unlabeled ones of the elements.

20 Claims, 12 Drawing Sheets

FIG. 2 procedure TOPOLOGY DISCOVERY ($N$, AFTs)

1.    $\mathcal{Q}$ = INITSKELETONPATHS ($N$, AFT)
2.    do
3.      $done$ = true
4.      for each $Q_{s,t} \in \mathcal{Q}$ do
5.        $P_{s,t} = \bigcup_{U_k \in Q_{s,t}} U_k$
6.        $S$ = COMPUTECONSTRAINTS ($Q_{s,t}, \mathcal{Q}$)
7.        $Q_{s,t}^{new}$ = REFINEPATH ($P_{s,t}, S$)
8.        if ( $Q_{s,t}^{new} \neq Q_{s,t}$ ) then
9.          replace $Q_{s,t}$ by $Q_{s,t}^{new}$ in $\mathcal{Q}$
10.          $done$ = false
11.        endif
12.      endfor
13.    while (not $done$)
14. FINDCONNECTIONS ($\mathcal{Q}$)

procedure INIT SKELETONPATHS ($N$, AFTs)
1. $\mathcal{Q} = \emptyset$
2. for each $N \in N$ do
3.    for each $\{s,t\} \in N$ do
4.       $X = \{v | v \in V - \{s,t\} \wedge \exists v(s) \neq v(t),$
          such that $s \in F_{v,v(s)} \wedge t \in F_{v,v(t)}\}$
5.       if $(X \cap N = \emptyset)$ then
6.          $Q_{s,t} = <\{s(t)\}, \{v(s), v(t) | v \in X\}, \{t(s)\}>$
7.          $\mathcal{Q} = \mathcal{Q} \cup \{Q_{s,t}\}$.
8.       endif
9.    endfor
10. endfor
11. return $(\mathcal{Q})$

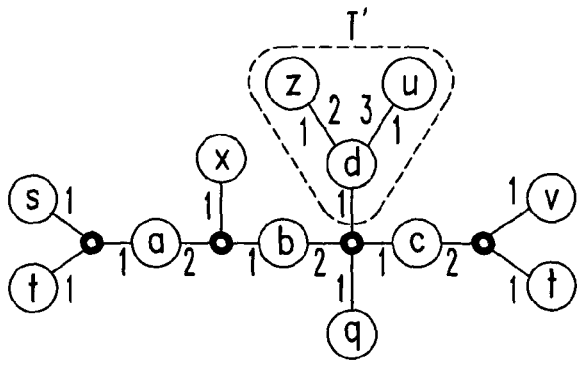

$F_{a1} = \{r,s\}$    $F_{a2} = \{q,t\}$
$F_{b1} = \{s,x\}$    $F_{b2} = \{t,z\}$
$F_{c1} = \{s,u\}$    $F_{c2} = \{t,v\}$
$F_{d1} = \{x,v\}$    $F_{d2} = \{z\}$
$F_{d3} = \{u\}$
$F_{s1} = \{t\}$    $F_{t1} = \{s\}$
$F_{x1} = \{z\}$    $F_{z1} = \{x\}$
$F_{u1} = \{v\}$    $F_{v1} = \{u\}$
$F_{r1} = \{q\}$    $F_{q1} = \{r\}$ (a) The considered network.    (a) The complete AFTs.

$Q_{u,v}$: (u1)—( c1,c2,d3,d1 )—(v1)    $Q_{u,v}$: (u1)-(d3)-(d1)-(c1)-(c2)-(v1)

$Q_{s,t}$: (s1)—( a1,a2,b1,b2,c1,c2 )—(t1)    $Q_{s,t}$: (s1)-(a1)-(a2)-(b1)-(b2)-(c1)-(c2)-(t1)

$Q_{x,z}$: (x1)—( b1,b2,d1,d2 )—(z1)    $Q_{x,z}$: (x1)— o o o —(z1)

$Q_{r,q}$: (r1)—( a1,a2,b1,b2 )—(q1)    $Q_{r,q}$: (r1)— o o o —(q1)

(c) The initial skeleton-paths.    (d) The refined skeleton-paths $Q_{u,v}$ and $Q_{s,t}$.

*FIG. 5*

FIG. 6 procedure COMPUTECONSTRAINTS ($Q_{s,t}, \mathcal{Q}$)
1. $\mathcal{Q}^I_{s,t} = \{Q_{x,z} | Q_{x,z} \in \mathcal{Q} \text{ and } P_{x,z} \cap P_{s,t} \neq \emptyset\}$
2. $\mathcal{Q}^{NI}_{s,t} = \{\mathcal{Q} - \mathcal{Q}^I_{s,t}\}$
3. $S = \{<\{v(s)\}, \{v(t)\}> | \forall v \neq s, t \text{ on the } s-t \text{ path}\}$
4. for each $Q_{x,z} \in \mathcal{Q}^I_{s,t}$ do     //Note that $Q_{s,t} \in \mathcal{Q}^I_{s,t}$
5.     Compute the projection $Q^{s,t}_{x,z} = \{U_1, \cdots, U_k\}$
6.     $S = S \cup \{<U_1, \emptyset>\}$
7.     for $j = 2$ to $K$ do
8.         $S = S \cup \{<U_{j-1}, U_j>\}$
9. endfor
10. // Compute the port-bin collection $\mathcal{B}$
11. $\mathcal{B} = \{\{P_{u,v}\} | Q_{u,v} \in \mathcal{Q}^{NI}_{s,t}\} \cup$
    $\{\{\text{ all ports}(v,k)\} | v \in V - P_{s,t}\}$
12. while there are $B_1, B_2, \in \mathcal{B}$ s.t.$(B_1 \cap B_2 \neq \emptyset)$ do
13.     $\mathcal{B} = \mathcal{B} - \{B_1, B_2\} \cup \{\{B_1 \cup B_2\}\}$
14. // Discover implicit path constraints on $Q_{s,t}$
15. for each $Q_{x,z}, Q_{u,v} \in \mathcal{Q}^I_{s,t}$ and $B \in \mathcal{B}$ s.t. $[(I^{s,t}_{x,y} \neq I^{s,t}_{u,v})$
    and $(P_{x,y} \cap B \neq \emptyset)$ and $(P_{u,v} \cap B \neq \emptyset)]$ do
16.     $S = S \cup \{<I^{s,t}_{x,z} \cup I^{s,t}_{u,v}, \emptyset>, <I^{s,t}_{x,z} \cap I^{s,t}_{u,v}, \emptyset>,$
        $<I^{s,t}_{x,z} - I^{s,t}_{u,v}, \emptyset>, <I^{s,t}_{u,v} - I^{s,t}_{x,z}, \emptyset>\}$
17.     if $(I^{s,t}_{x,z} \cap I^{s,t}_{u,v} \neq \emptyset)$ then
18.         if [ FIRST $(Q_{x,z}, I^{s,t}_{x,z}) <$ LAST $(Q_{x,z}, B)$ or
            LAST $(Q_{u,v}, I^{s,t}_{u,v}) >$ FIRST $(Q_{u,v}, B)$ ] then
19.             $S = S \cup \{<I^{s,t}_{x,z}, I^{s,t}_{u,v}>\}$

CONTINUED ON SHT. 6/12

CONTINUED FROM SHT. 5/12

↓

20.     else if [ FIRST $(Q_{u,v}, I_{u,v}^{s,t}) <$ LAST $(Q_{u,v}, B)$ or

LAST $(Q_{x,z}, I_{u,v}^{s,t}) >$ FIRST $(Q_{x,z}, B)$] then

21.     $S = S \cup \{< I_{u,v}^{s,t}, I_{x,z}^{s,t} >\}$

22.     endif

23. else // i.e., $I_{x,z}^{s,t} \cap I_{u,v}^{s,t} \neq \emptyset$, assume $I_{x,y}^{s,t} \supset I_{u,v}^{s,t}$ 24.     if [ FIRST $(Q_{x,z}, I_{x,z}^{s,t}) <$ LAST $(Q_{x,z}, B)$ or FIRST $(Q_{u,v}, I_{u,v}^{s,t}) <$ LAST $(Q_{u,v}, B)$] then

25.     $S = S \cup \{< (I_{x,z}^{s,t} - I_{u,v}^{s,t}), I_{u,v}^{s,t} >\}$

26.     elseif [ LAST $(Q_{x,z}, I_{x,z}^{s,t}) >$ FIRST $(Q_{x,z}, B)$ or

LAST $(Q_{u,v}, I_{u,v}^{s,t}) >$ FIRST $(Q_{u,v}, B)$] then

27.     $S = S \cup \{< I_{u,v}^{s,t}, (I_{x,z}^{s,t} - I_{u,v}^{s,t}) >\}$

28.     endif

29.   endif

30. endfor

31. return $S$

FIG. 8

```
procedure REFINEPATH (P, S)
1.  L = < P >
2.  R = {s_i^1, s_i^2, s_i^1 ∪ s_i^2 | ∀ < s_i^1, s_i^2 > ∈ S}
3.  C = R  ∪ {{k} | ∀k ∈ P} - {P, ∅}
4.  while there exist R_i ≠ R_j ∈ C s.t. R_i ∩ R_j ≠ ∅ do
5.      C = C - {R_i, R_j} ∪ {R_i ∪ R_j}
6.  endwhile
7.  if |C| > 2 then return (L)
8.  else if (C = {C_1, C_2}) then
9.      L = ORIENTPATH (<C_1, C_2>, S)
10. else // R comprises a single connected group
11.     R_i = the largest set in R
12.     R_j = set in R that is INC with R_i.
13.     L = < R_i - R_j, R_i ∩ R_j, R_j - R_i > ; P_L = R_i ∪ R_j
14.     while there exist R ∈ R s.t. [ ( R and P_L are INC ) or
            ( R and some U_j ∈ L are INC ) ] do
15.         for each U_j ∈ L that is INC with R do
16.             if [ ( j < |L| and U_{j+1} ∩ R ≠ ∅ ) or
                  ( j = |L| and U_{j-1} ∩ R = ∅ ) ] then
17.                 replace U_j with < U_j - R, U_j ∩ R >.
18.             else replace U_j with < U_j ∩ R, U_j - R >.
19.             endif
20.         endfor
21.         if R and P_L are INC then
22.             P_L = P_L ∪ R
23.             if (U_1 ⊂ R) then L = < R - P_L > ∘ L
```

CONTINUED ON SHEET 9/12

*FIG. 8*

CONTINUED FROM SHEET 8/?

24.   else $L = L \circ < R - P_L >$
25.   endif
26.  endwhile
27.  $L = \text{ORIENTPATH}(L, S)$
28. endif
29. if $|L| = 1$ then return $(< P >)$
30. $Q = \epsilon$  // the empty path
31. for $j = 1$ to $|L|$ do
32.  if $(|Uj| = 1)$ then $Q = Q \circ < Uj >$
33.  else
34.   $S_j = \{ < S_j^1, S_j^2 > \in S \text{ such that } S_j^1 \cup S_j^2 \subseteq U_j \}$
35.   $Q = Q \circ \text{REFINEPATH}(U_j, S_j)$
36.  endif
37. endfor
38. return $(Q)$

FIG. 9 procedure ORIENTPATH $(L, S)$

1.    for each $< S_i^1, S_i^2 > \in S$ do
2.       if ( FIRST$(L, S_i^1)$ < LAST $(L, S_i^2)$ then return $(L)$
3.       else if (FIRST $(L, S_i^2)$ < LAST $(L, S_i^1)$ then
4.          return (REVERSE $(L)$)
5.       endif
6.    endfor
7.    return $(< \bigcup_{U_j \in L} U_j >)$

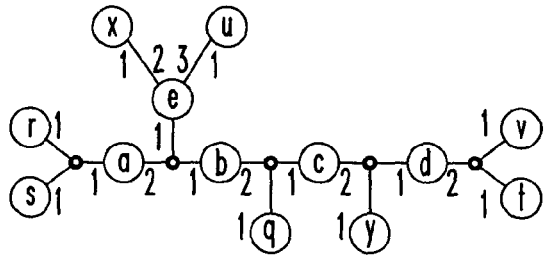
(a) The true network topology
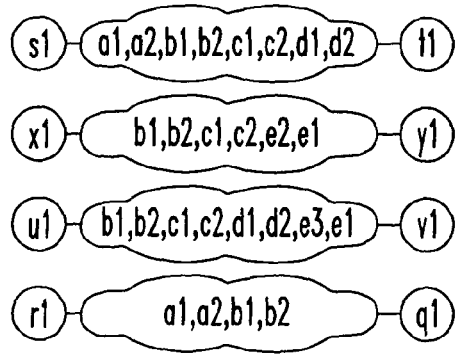
(b) The initial skeleton-paths.
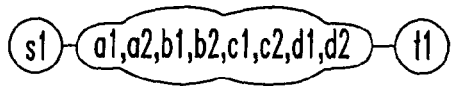
(c) The skeleton-paths after the first iteration.
(c) The skeleton-paths after the second iteration.
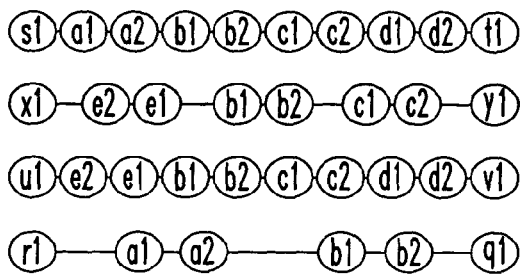
(e) The skeleton-paths after the third iteration.
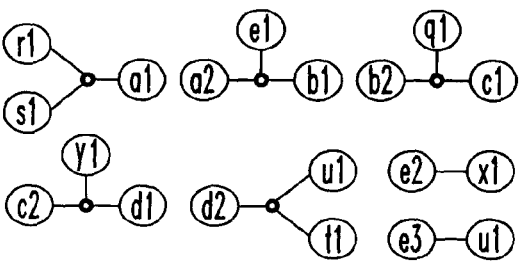
(f) The resulting connections from the skeleton-paths.
*FIG. 10*

SYSTEM AND METHOD FOR DETERMINING THE PHYSICAL TOPOLOGY OF A NETWORK HAVING MULTIPLE SUBNETS

TECHNICAL FIELD OF THE INVENTION

The present invention is directed, in general, to computer networks and, more specifically, to a system and method for determining the physical topology of a network, such as an Ethernet computer network, having multiple subnets.

BACKGROUND OF THE INVENTION

"Physical network topology" refers to the characterization of the physical connectivity relationships that exist among elements (e.g., devices and links) in a communication network. Discovering the physical layout and interconnections of network elements is a prerequisite to many critical network management tasks, including reactive and proactive resource management, server siting, event correlation, and root-cause analysis.

For example, consider a fault monitoring and analysis application running on a central Internet Protocol (IP) network management platform. Typically, a single fault in the network will cause a flood of alarm signals emanating from different interrelated network elements. Knowledge of network element interconnections is essential to filter out secondary alarm signals and correlate primary alarms to pinpoint the original source of failure in the network (see, Katzela, et al., "Schemes for Fault Identification in Communication Networks," IEEE/ACM Trans. on Networking, vol. 3, no. 6, December 1995 and Yemini, et al., "High Speed & Robust Event Correlation," IEEE Communications, 1996, incorporated herein by reference). Furthermore, a full physical map of the network enables a proactive analysis of the impact of link and device failures.

Despite the critical role of physical topology information in enhancing the manageability of modern IP networks, obtaining such information is a very difficult task. The majority of commercial network-management tools feature an IP mapping functionality for automatically discovering routers and subnets and generating a "network layer" (i.e., ISO layer-3) topology showing router-to-router interconnections and router interface-to-subnet relationships. Building a layer-3 topology is relatively easy, because routers must be explicitly aware of their neighbors to perform their basic function. Therefore, standard routing information is adequate to capture and represent layer-3 connectivity.

Unfortunately, layer-3 topology covers only a small fraction of the interrelationships in an IP network, since it fails to capture the complex interconnections of "physical layer" (i.e., ISO layer-2) network elements (switches, bridges and hubs) that comprise each Ethernet Local Area Network (LAN). Hardware providers such as Cisco and Intel have designed their own proprietary protocols for discovering physical interconnections, but these tools are of no use in a heterogeneous, multi-vendor network.

More recently, the IETF has acknowledged the importance of this problem by proposing a "physical topology" SNMP Management Information Base (MIB) (see, Bierman, et al., "Physical Topology MIB," Internet RFC-2922, September 2000, incorporated herein by reference), but the proposal merely reserves a portion of the MIB space without defining any protocol or algorithm for obtaining the topology information. Clearly, as more switches, bridges, and hubs are deployed to provide more bandwidth through subnet micro-segmentation, the portions of the network infrastructure that are "invisible" to current network-management tools will continue to grow. Under such conditions, it is obvious that the network manager's ability to troubleshoot end-to-end connectivity or assess the potential impact of link or device failures in switched networks will be severely impaired.

Developing effective algorithmic solutions for automatically discovering the up-to-date physical topology of a large, heterogeneous network poses several difficult challenges. More specifically, there are three fundamental sources of complexity for physical topology discovery.

(1) Inherent Transparency of Layer-2 Hardware. Layer-2 network elements (switches, bridges, and hubs) are completely transparent to endpoints and layer-3 hardware (routers) in the network. Switches themselves only communicate with their neighbors in the limited exchanges involved in the spanning tree protocol (see, Keshav, "An Engineering Approach to Computer Networking", Addison-Wesley Prof. Computing Series, 1997, incorporated herein by reference), and the only state maintained is in their Address Forwarding Tables (AFTs), which are used to direct incoming packets to the appropriate output port.

Fortunately, most switches/bridges make this information available through a standard SNMP MIB (see, Case, et al., "A Simple Network Management Protocol (SNMP)," Internet RFC-1157, and, Stallings, "SNMP, SNMPv2, SNMPv3, and RMON 1 and 2", Addison-Wesley Longman, Inc., 1999, (3rd Edition), incorporated herein by reference.)

(2) Multi-Subnet Organization. Modern switched networks usually comprise multiple subnets with elements in the same subnet communicating directly (i.e., without involving routers) whereas communication between elements in different subnets must traverse through the routers for the respective subnets. Furthermore, elements of different subnets are often directly connected to each other. This introduces serious problems for physical topology discovery, since it means that an element can be completely invisible to its direct physical neighbor(s).

(3) Transparency of "Dumb" or "Uncooperative" Elements. Besides SNMP-enabled bridges and switches that are able to provide access to their AFTs, a switched network can also deploy "dumb" elements such as hubs to interconnect switches with other switches or hosts. (Though properly designed networks would not use hubs to interconnect switches, it often occurs in practice.) Hubs do not participate in switching protocols and, thus, are essentially invisible to switches and bridges in the network. Similarly, the network may contain switches from which no address-forwarding information can be obtained either because they do not accommodate SNMP or because SNMP access to the switch is disabled. Clearly, inferring the physical interconnections of "dumb" and "uncooperative" devices based on the limited AFT information obtained from other elements poses a nontrivial algorithmic challenge.

SNMP-based algorithms for automatically discovering network layer (i.e., layer-3) topology are featured in many common network management tools, such as Hewlett Packard's OpenView and IBM's Tivoli.

Recognizing the importance of layer-2 topology, a number of vendors have recently developed proprietary tools and protocols for discovering physical network connectivity. Examples of such systems include Cisco's Discovery Protocol and Bay Networks' Optivity Enterprise. Such tools, however, require vendor-specific extensions to SNMP MIBs and are useless in a heterogeneous network comprising elements from multiple vendors in which only standard SNMP information is available.

Breitbart, et al., "Topology Discovery in Heterogeneous IP Networks," in Proc. of IEEE INFOCOM 2000, March 2000 (incorporated herein by reference) proposed an algorithm that relies solely on standard AFT information collected in SNMP MIBs to discover the physical topology of heterogeneous networks comprising switches and bridges organized in multiple subnets. However, that algorithm assumed that AFT information is available from every node in the underlying network and thus cannot cope with hubs or uncooperative switches.

Lowekamp, et al., "Topology Discovery for Large Ethernet Networks," in Proc. of ACM SIGCOMM, August 2001 suggested techniques for inferring network-element connectivity using incomplete AFT information and also discussed how to handle dumb/uncooperative elements. However, their algorithm is suitable only in the much simpler case of a single subnet and fails when multiple subnets are present. For instance, the Lowekamp, et al., algorithm cannot infer the topology of a network having multiple subnets, although the AFTs uniquely define the topology. Thus, the prior art contains no physical topology discovery technique that addresses all three objectives set forth above.

Accordingly, what is needed in the art is a practical, algorithmic solution for discovering the physical topology of large, heterogeneous IP networks comprising multiple subnets as well as (possibly) dumb or uncooperative elements. What is further needed in the art is a way to determine physical topology that relies substantially solely on standard information routinely collected in the SNMP MIBs of elements and that preferably requires no modifications to any operating system software running on elements or hosts.

SUMMARY OF THE INVENTION

To address the above-discussed deficiencies of the prior art, the present invention provides a system for, and method of, determining a physical topology of a network having multiple subnets. In one embodiment, the system includes: (1) a skeleton path initializer that uses addressing information from elements in the network to develop a collection of skeleton paths of direct physical connections between labeled ones of the elements, the skeleton paths traversing multiple of the subnets and (2) a skeleton path refiner, coupled to the skeleton path initializer, that refines the collection by inferring, from the direct physical connections and path constraints derived therefrom, other physical connections in the skeleton paths involving unlabeled ones of the elements.

The system is particularly useful for determining the physical topology of a LAN that employs transparent bridges and supports multiple subnets. In the context of such LAN, the present invention finds the physical network topology defined by the active ports, determined by the spanning tree algorithm defined in IEEE 802.1D standard 1998 edition, subject to revision. As a result, the considered network topology has a tree structure.

The topology-discovery algorithm that underlies the present invention introduces the broad concept of inferring connectivity information in the presence of hubs and/or switches that cannot or will not provide information regarding their connectivity. In one embodiment, the algorithm initially employs address forwarding information from address forwarding tables (AFT) supplied by SNMP-enabled elements to produce a partial, coarse view of the underlying network topology as a collection of skeleton paths.

The skeleton-path mechanism is a generalization of traditional paths that captures whatever partial knowledge can be accumulated on the actual network topology. The algorithm then enters an iterative, skeleton-path refinement process during which explicit and/or implicit constraints inferred from the overall skeleton-path collection are exploited to refine the topology information in individual skeleton paths.

Once all skeleton paths have been resolved into complete arrangements of network elements, the algorithm disclosed herein stitches the skeleton paths together to infer the underlying network topology including the connections of "invisible" hubs and uncooperative switches. It is anticipated that initialized skeleton paths will be refined, which will give rise to the opportunity to initialize further skeleton paths, and so on. It is well known that even complete AFT information from all network nodes is often insufficient to uniquely identify the underlying physical network topology.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 2 illustrates a pseudocode listing of a TOPOLOGYDIS-COVERY routine constructed according to the principles of the present invention;

FIGS. 4A and 4B together illustrate exemplary network graphs in which implicit path constraints are computed;

FIG. 5A illustrates an exemplary network graph;

FIG. 5B illustrates complete address forwarding tables for the exemplary network graph of FIG. 5A;

FIG. 5C illustrates initial skeleton paths in the exemplary network graph of FIG. 5A;

FIG. 5D illustrates refined skeleton paths in the exemplary network graph of FIG. 5A;

FIG. 6 illustrates a pseudocode listing of a COMPUTECON-STRAINTS routine constructed according to the principles of the present invention;

FIG. 8 illustrates a pseudocode listing of a REFINEPATH routine constructed according to the principles of the present invention;

FIG. 9 illustrates a pseudocode listing of an ORIENTPATH routine constructed according to the principles of the present invention;

FIG. 10A illustrates an exemplary true network topology;

FIG. 10B illustrates initial skeleton paths in the exemplary network graph of FIG. 10A;

FIG. 10C illustrates skeleton paths in the exemplary network graph of FIG. 10A after a first iteration;

FIG. 10D illustrates skeleton paths in the exemplary network graph of FIG. 10A after a second iteration;

FIG. 10E illustrates skeleton paths in the exemplary network graph of FIG. 10A after a third iteration;

FIG. 10F illustrates resulting physical connections in the exemplary network graph of FIG. 10A;

DETAILED DESCRIPTION

Definitions and a System Model

Figure 1:
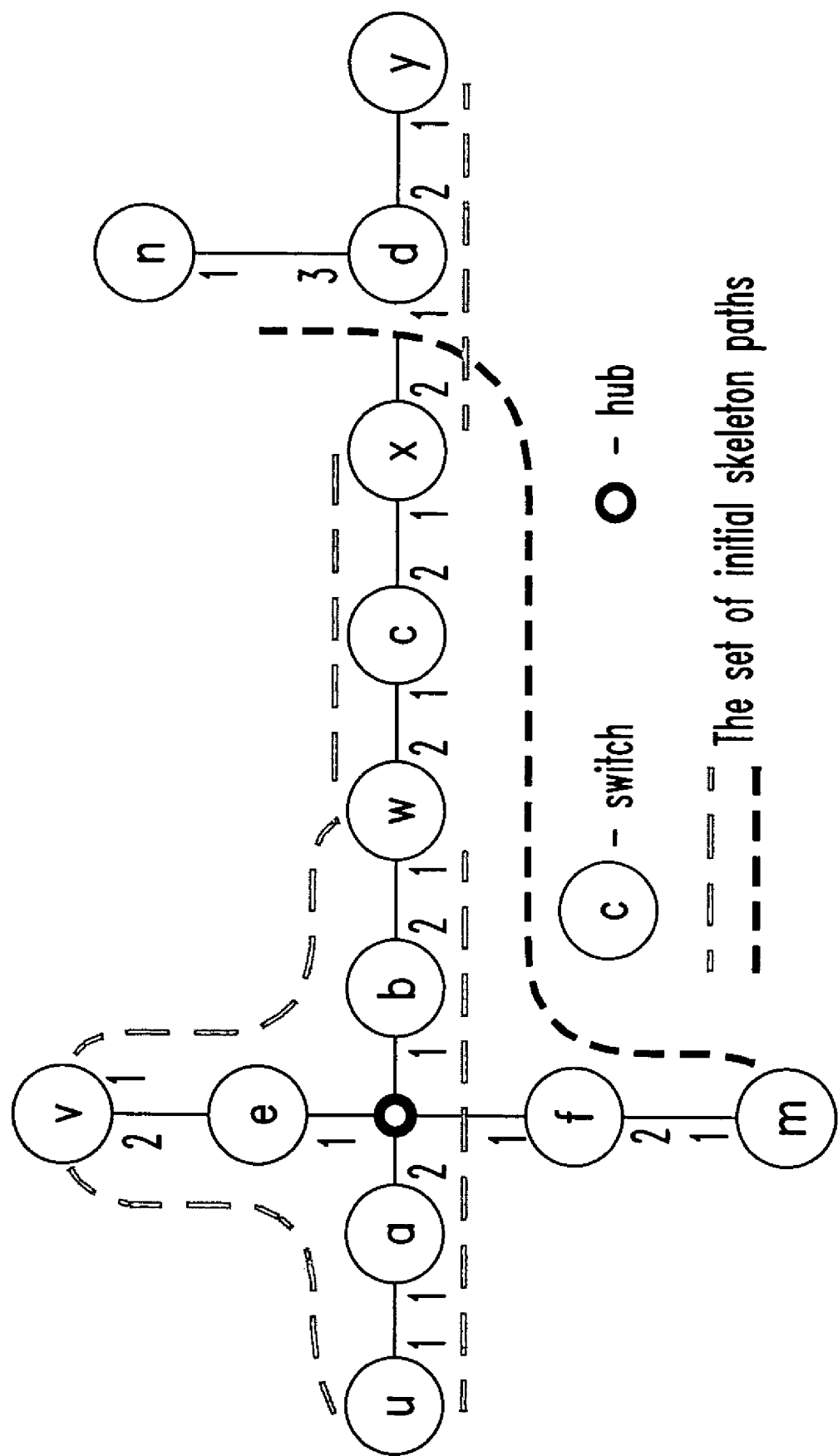
FIG. 1 illustrates an exemplary network graph and its decomposition in skeleton paths on which an embodiment of a system constructed according to the principles of the present invention can operate to discover a physical topology.

In this section, some preliminary information and the system model that adopted for the physical topology discovery problem are presented. The domain over which topology discovery is to be performed is referred to herein as a "switched domain," which essentially comprises a maximal set S of switches such that there is a skeleton path between every pair of switches involving only switches in S. (Switches are essentially bridges with many ports, so the terms "switch" and "bridge" can be used interchangeably; "switch" will hereinafter primarily be used.)

More specifically, the target switched domain is modeled as an undirected tree $G=(V, E)$, where each node in V represents a network element and each edge in E represents a physical connection between two element ports. The set V comprises both labeled and unlabeled nodes. Labeled nodes basically represent switches, routers, and hosts that have a unique identifying MAC address and can provide AFT information through SNMP queries to the appropriate parts of their MIB; unlabeled nodes, on the other hand, represent both "dumb" hub devices or switching elements with no SNMP support. (Note that end-hosts and routers in the network are represented as leaf node in G, and are practically indistinguishable for the purposes of layer-2 topology discovery.)

To simplify the discussion, labeled and unlabeled nodes are hereinafter respectively referred to as "switches" and "hubs." Note that the graph G essentially captures the (tree) topology of unique active forwarding skeleton paths for elements within a switched domain as determined by the spanning tree protocol (see, Keshav, supra). (Note that end-hosts and routers in the network are represented as leaf nodes in G, and are practically indistinguishable for the purposes of layer-2 topology discovery.)

The topology discovery algorithm disclosed herein is based on using the MAC addresses learned through backward learning on ports that are part of the switched-domain spanning tree (and stored at the port AFTs of labeled network nodes). The notation (v,k) identifies the $k^{th}$ port of node $v \in V$, and $F_{v,k}$ denotes the set AFT entries at port (v,k) (i.e., the set of MAC addresses that have been seen as source addresses on frames received at port (v,k)). (To simplify notation, the parentheses and comma will often be omitted from the port-id notation when referring to a specific port of v, e.g., v1, v2, and so on.)

Since G is a tree, a unique path exists in G between every pair of nodes s, $t \in V$. The symbol $P_{s,t}$ is used to identify the set of port-ids along the skeleton path from s to t (also referred to as the "s-t skeleton path"). The notation $v_u$ is used to denote the port of node v at which (the address of) node u is found (i.e., the port of v leading to u in G).

Table I summarizes the key notation used herein, along with a brief description of its semantics. Additional notation will be introduced when necessary.

TABLE I

Key Notation Used Herein

| Symbol | Semantics |
| --- | --- |
| $G = (V, E)$ | Switched-domain network graph (tree) |
| (V, k) | kth port of node $v \in V$ (v1, v2 . . . ) |
| $F_{v,k}$ | AFT entries at (i.e., nodes reachable from) (v, k) |
| v(u) | Part of node v leading to node u in G |
| $N_v$ | Subnets in G containing v in their spanning subtree |
| $P_{s,t}$ | Set of switch ports along the path from s to t in G |
| $Q_{s,t}$ | Skeleton path from s to t in G |
| $I_{x,z}^{s,t}$ | Set of ports at the intersection of $P_{s,t}$ and $P_{x,z}$ |
| $Q_{x,z}^{s,t}$ | Projection of path $Q_{x,z}$ onto path $Q_{s,t}$ |

Every labeled node in the switched domain G is associated with one or more subnets. A subnet is a maximal set of network elements $N \subseteq V$ such that any two elements in N can communicate directly with each other without involving a router, while communication across different subnets must go through a router.

Thus, a packet from node s to node t in the same subnet N traverses exactly along the set of ports $P_{s,t}$ in G. Typically, every network element within a switched domain is identified with a single IP address and a subnet mask that defines the IP address space corresponding to the element's subnet. For example, IP address 135.104.46.1 along with subnet mask 255.255.255.0 identifies a subnet of network elements with IP addresses of the form 135.104.46.x, where x is any integer between 1 and 254.

Let N be the collection of subnets of the graph G. Every subnet $N \in N$ defines a connecting subtree in G, that is, a tree subgraph of G that is essentially spanned by the nodes in subnet N, and contains all nodes and edges of G that lie on paths between any pair of nodes in N. Let $N_v \subseteq N$ denote the collection of subnets containing node $v \in V$ in their connecting subtrees. Clearly, the AFTs at the ports of node contain node-reachability information only for the subnets in $N_v$.

The AFT $F_{v,k}$ of v is said to be "complete" if, for all $N \in N_v$, $F_{v,k}$ contains the MAC addresses of all nodes in N that are reachable by port (v,k). The physical topology discovery algorithms disclosed herein rely on the assumption that the AFT information obtained from labeled nodes in the network is complete. This completeness requirement can be enforced using, for instance, "spoofed" ICMP-echo packets to force switch communication (as described in Breitbart, et al., "Topology Discovery in Heterogeneous IP Networks," in Proc. of IEEE INFOCOM 2000, March 2000, incorporated herein by reference).

Overview of the Disclosed Topology Discovery Algorithm

A goal of the algorithm disclosed herein is to discover the physical topology of the underlying multi-subnet network represented by the switched domain graph $G=(V,E)$ as accurately as possible using only the AFT information provided by labeled nodes in G. Thus, the topology-discovery algorithm uses the AFT information provided to: (1) discover the direct physical connections between labeled element (i.e., switch) ports, and (2) infer the existence of unlabeled nodes (i.e., hubs) in G as well as the set of switch ports that are connected to each hub. A key tool employed in the topology discovery algorithm is the concept of skeleton paths.

A "skeleton path" from node s to node t in G is defined as a sequence $Q_{s,t}=<U_1, U_2, \ldots, U_K>$ of non-empty port-id sets $U_1, \ldots, U_K$, forming a partition of $P_{s,t}$ ($U_i \cap U_j = \phi, \cup_i U_i = P_{s,t}$) such that: (1) each $U_j$ contains the port-ids of a contiguous segment of the s-t path; and, (2) for each i<j, all the port-ids in $U_i$ precede those in $U_j$ on the s-t path.

Intuitively, an s-t skeleton path describes some partial knowledge (i.e., port ordering information) about the actual s-t path in the network graph G. This partial knowledge basically describes subsets of ports $U_j$ that are known to be contiguous in the path from s to t in G, as well as the ordering of these subsets as G is traversed from s to t. Thus, the "coarsest" s-t skeleton path comprises a single large subset $U_i$ between nodes s and t with essentially no port-ordering information, whereas in the "finest" s-t skeleton path, each $U_i$ is a singleton (a single port-id) and the complete ordering of the ports on the s-t path is specified. Note that determining the set of switch port-ids to be included in an s-t skeleton path using AFT information is fairly straightforward when s and t belong to the same subnet.

An important observation is that a node v is on the path from s to t in G if and only if there are two distinct ports v(s) and v(t) of v such that v "sees" node s(t) at port v(s) (resp., v(t)) (i.e., $s \in F_{v,v(s)}$ and $t \in F_{v,v(t)}$). Also note that, since the skeleton-path definition assumes that the path is oriented from s to t, port v(s) always precedes port v(t) on the s-t path. Thus, v(s) is always denoted before v(t) in the skeleton path $Q_{s,t}$ (even when these ports are in the same $U_i$ subset). This port-ordering rule for each node is obtained from the AFT information at v.

Referring initially to FIG. 1, illustrated is an exemplary network graph and its decomposition in skeleton paths on which an embodiment of a system constructed according to the principles of the present invention can operate to discover a physical topology. The numbers near the links represent the port-ids. Nodes u, v, w, x, y are in one subnet, nodes m,n in another subnet, and every one of the nodes a, b, c, d, e, f defines a separate subnet (with only one node). One possible skeleton path from node u to node x is: $Q_{u,x}=<\{u1\}, \{a1,a2, b1,b2\}, \{w1\}, \{w2\}, \{c1\}, \{c2\}, \{x1\}>$.

Clearly, this skeleton path only provides partial information on the topology of the true u-x path in G. More specifically, $Q_{u,x}$ specifies that the ports x1 and c2 are directly connected or they are connected to the same hub. Similarly, $Q_{u,x}$ also indicates that port w1 is connected (either directly or through a hub) to one of a2 or b2. (Note that, since port a1 (b1) precedes a2 (resp., b2) on the u-x path and w1 succeeds nodes a and b in $Q_{u,x}$, w1 can only be connected to a2 or b2.)

Turning now to FIG. 2, illustrated is a pseudocode listing of a TOPOLOGYDISCOVERY routine constructed according to the principles of the present invention. At a high level, the TOPOLOGYDISCOVERY algorithm represents the underlying network as a collection of skeleton paths, Q, between pairs of nodes belonging to the same subnet, and proceeds by iteratively refining Q to provide more accurate topology information for G. The initial input to the disclosed algorithm is the collection of subnets N in the network G as well as the AFT information from all labeled nodes (switches) in G.

As a first step, the disclosed algorithm computes an initial collection of skeleton paths Q that, essentially, captures the given AFT information by identifying the set of port-ids between selected pairs of nodes that "cover" all paths in G (procedure InitSkeletonPaths). The disclosed algorithm then enters an iterative skeleton-path refinement process that tries to determine a complete port order for each skeleton path in Q. The key idea here is to use the aggregate information in Q to refine the internal $U_i$ subsets of each skeleton-path $Q_{s,t} \in Q$ into smaller subsets, until either a complete order is obtained or no further refinement is possible.

This path-refinement task for skeleton path $Q_{s,t}$ is performed with the help of two procedures. First, procedure COMPUTECONSTRAINTS exploits the information in Q (more specifically, the intersections of $Q_{s,t}$ with other skeleton paths in Q) to obtain a collection S of additional constraints (termed path constraints) on the port order in $Q_{s,t}$. Second, procedure REFINEPATH uses the discovered set of path constraints S to further refine $Q_{s,t}$. When no further skeleton-path refinements are possible, the disclosed algorithm invokes a FINDCONNECTIONS procedure that uses the refined paths to generate the switch and hub connections discovered in G.

One of the main challenges lies in determining the most complete set of path constraints for each skeleton path $Q_{s,t}$, so the amount of port-ordering knowledge incorporated in $Q_{s,t}$ is employed to maximum advantage during future iterative-refinement steps. As will be described hereinafter, such path constraints can result from rather complicated intersection patterns of several skeleton paths in Q. Thus, it is difficult to obtain directly the "full" set of path constraints that would allow an initial $Q_{s,t}$ skeleton path to be refined into a complete port order in a single step.

However, even partial-order information obtained through a subset of the constraints imposed on $Q_{s,t}$ can be used further to refine other skeleton paths in Q during future iterations. Thus, the disclosed topology-discovery algorithm may require several iterative-refinement steps, during which skeleton paths in Q are further refined from iteration to iteration, until the algorithm eventually converges to the maximal possible port-ordering information for each path in G for the given set of inputs. The key algorithmic components of the disclosed topology-discovery algorithm will now be described in greater detail.

Initial Skeleton-Path Collection

The first task the disclosed algorithm faces is to "translate" the input AFT and subnet information into an initial collection of skeleton paths. An important observation here (and already discussed above) is that, for nodes s and t belonging to the same subnet, the AFT information can be used in a straightforward manner to determine the set of switch ports $P_{s,t}$ on the s-t path in G: if, for a node $v \neq s, t$, two distinct ports $v(s) \neq v(t)$ exist such that $s \in F_{v,v(s)}$ and $t \in F_{v,v(t)}$, then v(s), v(t) $\in P_{s,t}$; otherwise, v cannot be on the s-t path in G. Of course, the source and destination ports on nodes s and t can also be determined from their AFT information.

Thus, one solution to the initial skeleton-path construction problem is to build a skeleton path $Q_{(s,t)}$ for each pair s,t of distinct nodes belonging to the same subnet, for each of the underlying subnets. Although within the broad scope of the present invention, this approach may result in significant overlap between or among the resulting paths in Q. Consequently, such an approach may require that the port order for the same path segment be recomputed several times, resulting in increased computation-time overheads.

The disclosed embodiment of the algorithm instead relies on constructing a concise collection of skeleton paths for each subnet N such that paths between nodes of N in Q: (a) are not contained in other paths between N's nodes, and (b) cannot be broken into smaller paths between N's nodes. Intuitively, the resulting skeleton paths for subnet N "minimally" cover all nodes of N using the smallest possible segments between such nodes.

Figures 3, 4:
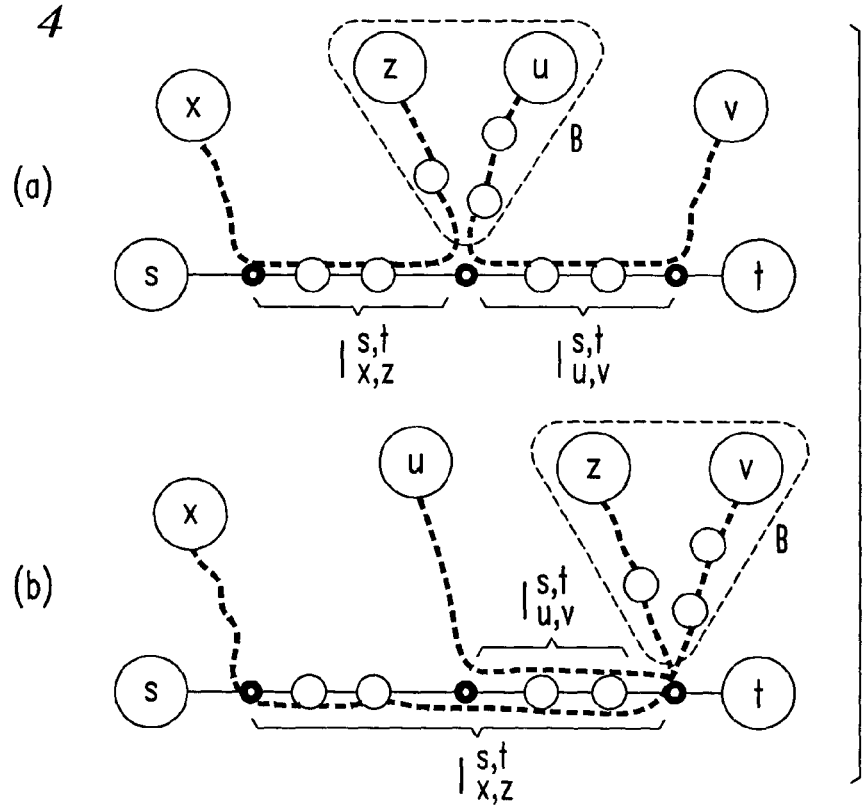
FIG. 3 illustrates a pseudocode listing of an INITSKELETON-PATHS routine constructed according to the principles of the present invention.

Turning now to FIG. 3, illustrated is a pseudocode listing of an INITSKELETONPATHS routine constructed according to the principles of the present invention. The disclosed INITSKELETONPATHS procedure builds this concise collection by considering, for each subnet N, all possible s-t paths with s, t∈N and adding an initial $Q_{s,t}$ skeleton path to Q only if the collection of intermediate nodes on the s-t path (denoted by X in FIG. 3) does not contain another N node. As an example, FIG. 1 depicts the six initial skeleton paths in Q for the network in the example given above.

Computing Skeleton-Path Constraints

Now, the problem of discovering a collection of constraints that will allow the disclosed algorithm to refine the port order for a given skeleton path $Q_{s,t} \in Q$ will be addressed. Abstractly, these constraints follow (either explicitly or implicitly) from the intersections of $Q_{s,t}$ with other skeleton paths in the Q collection. Some useful definitions and notational conventions are in order and will now be presented.

A skeleton path $Q_{x,z} \in Q$ is said to "intersect" $Q_{s,t}$ if $P_{s,t} \cap P_{x,z} \neq \phi$. The disclosed skeleton-path collection Q can be partitioned into two subsets $Q=Q_{s,t}^I \cup Q_{s,t}^{NI}$, where $Q_{s,t}^I (Q_{s,t}^{NI})$ contains all the paths in Q that intersect (resp., do not intersect) path $Q_{s,t}$. (Note that, trivially, $Q_{s,t} \in Q_{s,t}^I$.)

For any skeleton path $Q_{x,z} \in Q_{s,t}^I$, $I_{x,z}^{s,t}$ denotes the collection of port-ids in the intersection of the s-t and x-z skeleton paths, i.e., $I_{x,z}^{s,t}=P_{s,t} \cap P_{x,z}$. To simplify the exposition, all paths $Q_{x,z} \in Q_{s,t}^I$ are assumed have the same orientation as $Q_{s,t}$. That is, any port in their intersection $I_{x,z}^{s,t}$ faces either s and x, or t and z (the starting and ending points of the paths are on the same "side" of the network graph). Of course, either $Q_{x,z}$ or $Q_{z,x}$ must have the same orientation as $Q_{s,t}$, and this can be easily resolved from the AFTs of ports in $I_{x,z}^{s,t}$. Constraints on the port order in $Q_{s,t}$ can result from the projection of another path $Q_{x,z} \in Q_{s,t}^I$, onto $Q_{s,t}$, which is formally defined below.

The "projection" of $Q_{x,z} \in Q_{s,t}^I$ onto $Q_{s,t}$, denoted by $Q_{x,z}^{s,t}$, is the skeleton path that results by taking the intersection of every subset $U_k \in Q_{x,z}$ with the set $P_{s,t}$ and omitting empty sets; that is, $Q_{x,z}^{s,t}=<U_1 \cap P_{s,t}, \ldots, U_K \cap P_{s,t} | U_\ell \in Q_{x,z}$ and $U_\ell \cap P_{s,t} \neq \phi>$. Clearly, any path projection onto $Q_{s,t}$ is essentially a valid skeleton representation for a segment of the true s-t path in G and, as such, can enforce additional constraints on the port order in $Q_{s,t}$.

Such constraints can be broadly classified into two types: (1) contiguity constraints forcing a given subset $S \subset P_{s,t}$ of port-ids to define a contiguous segment of the s-t path (e.g., any $S=U_i \cap P_{s,t} \neq \phi$); and (2) order constraints forcing all port-ids in a subset $S^1 \subset P_{s,t}$ to precede those of another subset $S^2 \subset P_{s,t}$ (e.g., $S^1=U_i \cap P_{s,t}$ and $S^2=U_{i+1} \cap P_{s,t}$).

The following definition of path constraints captures both contiguity and order constraints. A path constraint $S_i=<S_i^1, S_i^2>$ for skeleton path $Q_{s,t}$ is an ordered pair of two disjoint subsets of port-ids $S_i^1, S_i^2 \subset P_{s,t}$ such that: (1) $S_i^1, S_i^2$ and $S_i^1 \cup S_i^2$ define contiguous segments of ports on the s-t path, and (2) the ports in $S_i^1$ precede those in $S_i^2$ in the path from s to t in G. A simple contiguity constraint S can be represented as $<S,\phi>$.

Computing Skeleton Path Constraints.

The disclosed algorithm for computing a collection of path constraints S on the skeleton path $Q_{s,t}$ using other paths in Q (i.e., procedure COMPUTECONSTPAINTS in FIG. 6) can now be described. Explicit path constraints, i.e., constraints that can be inferred directly from the AFT information and the projections of other skeleton paths in $Q_{s,t}^I$ onto $Q_{s,t}$ will first be discussed. Implicit path constraints, which are more subtle, will then be discussed.

Explicit Path Constraints.

Consider any switch v on the $Q_{s,t}$ skeleton path. Using the AFT information from v, the path constraint $<\{v(s)\}, \{v(t)\}>$ can be readily defined. The two ports of v on the path from s to t must be contiguous and the port facing s must precede that facing t. These constraints are added to S for all nodes v≠s,t on the $Q_{s,t}$ path.

Further, consider any (intersecting) skeleton path $Q_{x,z} \in Q_{s,t}^I$ and its projection $Q_{x,z}^{s,t}$ onto $Q_{s,t}$. As mentioned above, such a projection defines a valid skeleton representation for a segment of the true s-t path in G and, thus, defines additional contiguity and order constraints on $Q_{s,t}$. More specifically, for all projections $Q_{x,z}^{s,t}=\{U_1, U_2, \ldots, U_K\}$, S is augmented by adding the path constraints $<U_i, U_{i+1}>$ for all i=1, . . . , K (where $U_{K+1}=\phi$ is assumed to cover the case K=1).

Implicit Path Constraints.

Abstractly, implicit path constraints on $Q_{s,t}$ are obtained through the intersection of two or more paths with $Q_{s,t}$ as well as other parts of the network graph G. More specifically, consider the subgraph of G that is obtained by removing all ports in $P_{s,t}$ from the disclosed network. Since G is a tree, this subgraph is essentially a collection of subtrees $T_{s,t}$ of G such that each $T \in T_{s,t}$ is attached to a single connection point (i.e., switch or hub) on the $Q_{s,t}$ skeleton path. Implicit path constraints result from the intersection of paths in $Q_{s,t}^I$ with a given subtree $T \in T_{s,t}$ taking advantage of the above "single-connection-point" observation.

The disclosed algorithm needs to employ some knowledge about the set of port-ids within different subtrees in $T_{s,t}$ without knowing their exact topology. Accordingly, the disclosed algorithm collects this knowledge using a port-aggregation technique that partitions the ports not included in $P_{s,t}$ into a collection B of maximal, disjoint "bins", such that the ports in each bin B∈B are guaranteed to be included in a single subtree of $T \in T_{s,t}$ of G.

Note that this is only a sufficient condition, so that port-ids belonging to the same subtree $T \in T_{s,t}$ can in fact end up in different bins of B in the disclosed algorithm. Nevertheless, this condition still ensures that paths in $Q_{s,t}^I$ intersecting with the same bin B∈B share a single connection point on $Q_{s,t}$ and, therefore, can enforce implicit path constraints on $Q_{s,t}$. The disclosed technique for aggregating ports into bins relies on the following property, which follows directly from the fact that the disclosed network graph G is a tree.

Any pair of paths $Q_{x,z}, Q_{u,v}$ not intersecting $Q_{s,t}$ (i.e., $Q_{x,z}, Q_{u,v} \in Q_{s,t}^{NI}$) with $P_{x,z} \cap P_{u,v} \neq \phi$ belong to the same subtree $T \in T_{s,t}$. Thus, all ports on any two intersecting paths in $Q_{s,t}^{NI}$ can be safely placed in the same bin in B.

The disclosed algorithm works by initially defining: (1) for every node $v \notin P_{s,t}$, a bin $B_v$ containing all of v's ports, i.e., $B_v=\{(v,k)|(v,k)$ is a port of $v\}$; and (2) for every path $Q_{u,v} \in Q_{s,t}^{NI}$, a bin $B_{u,v}=P_{u,v}$. The algorithm then forms the final collection of bins B by iteratively merging any two bins whose intersection is non-empty until all bins are disjoint.

Turning now to FIGS. 4A and 4B, illustrated are exemplary network graphs in which implicit path constraints are computed. Given that the port bins B computed above are guaranteed to connect to a single point of the $Q_{s,t}$ skeleton path, they can be used in a manner equivalent to subtrees in $T_{s,t}$ for computing implicit path constraints on $Q_{s,t}$. Consider two (intersecting) paths $Q_{x,z}, Q_{u,v} \in Q_{s,t}^I$ that also intersect with a single bin B∈B, and let $I_{x,z}^{s,t}$ and $I_{u,v}^{s,t}$ denote their respective intersections with $P_{s,t}$. Since B has a single connection point to $Q_{s,t}$, the segments of $P_{s,t}$ defined by $I_{x,z}^{s,t}$ and $I_{u,v}^{s,t}$ have a common end-point (switch or hub) on the $Q_{s,t}$ path.

If $I_{x,z}^{s,t}$ and $I_{u,v}^{s,t}$ are disjoint, they are on opposite sides of the common connection point (FIG. 4A). Thus, their union $I_{x,z}^{s,t} \cup I_{u,v}^{s,t}$, defines a contiguity constraint on $Q_{s,t}$.

If, on the other hand, $I_{x,z}^{s,t}$ and $I_{u,v}^{s,t}$ intersect, they are on the same side of their common end-point (FIG. 4B), and one of them contains the other. Suppose that $I_{x,z}^{s,t} \supset I_{u,v}^{s,t}$. Then, $I_{x,z}^{s,t} - I_{u,v}^{s,t}$ also defines a contiguity constraint on $Q_{s,t}$. In general, given $Q_{x,z}$, $Q_{x,z} \in Q_{s,t}^I$ intersecting with a single port bin $B \in B$, all the implicit contiguity constraints added to the disclosed path constraint set $S$ are: $I_{x,z}^{s,t} \cup I_{u,v}^{s,t}$, $I_{x,z}^{s,t} \cap I_{u,v}^{s,t}$, $I_{u,v}^{s,t} - I_{u,v}^{s,t}$ (where, of course, empty sets are ignored).

The computed port bins and the single connection point property can also be exploited to infer order constraints on the $Q_{s,t}$ skeleton path. Consider two paths $Q_{x,z}$, $Q_{u,v} \in Q_{s,t}^I$ intersecting with bin $B \in B$, and assume that $I_{x,z}^{s,t}$ and $I_{u,v}^{s,t}$ are disjoint (FIG. 4A) (the case of intersecting $I_{x,z}^{s,t}$, $I_{u,v}^{s,t}$ can be handled similarly).

The key to determining the order of $I_{x,z}^{s,t}$ and $I_{u,v}^{s,t}$ on the s-t path lies in discovering if one of the two path segments precedes or succeeds the connection point of the B bin. To describe the two scenarios succinctly, the functions FIRST (Q, S) and LAST(Q, S) are defined to receive as input a skeleton path Q and a set of ports S, and return the index j of the first and last (respectively) subset $U_j \in Q$ that intersects S. It is apparent that, if FIRST($Q_{x,z}$, $I_{x,z}^{s,t}$)<LAST($Q_{x,z}$, B), then (since the s-t and x-z paths have the same orientation) the segment $I_{x,z}^{s,t}$ precedes the connecting point of bin B and the path constraint can be concluded to be <$I_{x,z}^{s,t}$, $I_{u,v}^{s,t}$>. Otherwise, if LAST($Q_{x,z}$, $I_{x,z}^{s,t}$)>FIRST($Q_{x,z}$, B), then the segment $I_{x,z}^{s,t}$ succeeds the connecting point of B, giving the path constraint <$I_{u,v}^{s,t}$, $I_{x,z}^{s,t}$>. (Note that at most one of the above conditions can hold since, by definition, $B \cap I_{x,z}^{s,t} = \phi$). If both conditions are false, the corresponding FIRST/LAST conditions for $Q_{u,v}$ are checked to see if they can determine an ordering for the two path segments.

Turning now to FIGS. 5A through 5D, illustrated respectively are (5A) an exemplary network graph, (5B) complete address forwarding tables for the exemplary network graph of FIG. 5A, (5C) initial skeleton paths in the exemplary network graph of FIGS. 5A and (5D) refined skeleton paths in the exemplary network graph of FIG. 5A.

In this example, hosts (i.e., leaf nodes) comprise four different subnets: {u,v}, {s,t}, {x,z} and {r,q}, and each switch (i.e., internal node) comprises a single-element subnet. The complete element AFTs are given in FIG. 5B and the initial collection of skeleton paths, Q, is shown in FIG. 5C.

Consider the path constraints Q imposes on the $Q_{u,v}$ path. From the AFT information, the constraints <{$d_3$}, {$d_1$}> and <{$c_1$}, {$c_2$}> are directly concluded. Also, $P_{u,v}$ intersects both $P_{s,t}$ and $P_{x,z}$ with $I_{x,z}^{u,v}$ and $I_{x,z}^{u,v} = \{c_1, c_2\}$. Further, since both $P_{s,t}$ and $P_{x,z}$ intersect with the bin $B_{r,q} = \{r_1, a_1, a_2, b_1, b_2, q_1\}$ (resulting from $P_{r,q} \in Q_{s,t}^{NI}$), the implicit contiguity constraint <{d3,c1,c2},$\phi$> results. The only u-v path arrangement satisfying the above constraints is $Q_{uv} = <\{u_1\}, \{d_3\}, \{d_1\}, \{c_1\}, \{c_2\}, \{v_1\}>$.

Now, consider path $Q_{s,t}$. Through the intersection of $P_{s,t}$ and $P_{r,q}$, the (explicit) contiguity constraint <{$a_1,a_2,b_1,b_2$},$\phi$> results. Also, through the intersection of $P_{s,t}$ and $P_{x,z}$ with both $P_{s,t}$ and the bin $B_d = \{d_1, d_2, d_3\}$, the (implicit) contiguity constraint <{$b_1,b_2,c_1,c_2$},$\phi$> can be inferred. These two constraints are not sufficient to define the port order on $P_{s,t}$ since both s-a-b-c-t and s-c-b-a-t satisfy them.

However, with the knowledge of the complete u-v path (above) an additional implicit order constraint can be inferred. Specifically, since $I_{u,v}^{s,t}$ and $I_{x,z}^{s,t}$ are disjoint and LAST($Q_{u,v}$, $I_{u,v}^{s,t}$)=5>FIRST($Q_{u,v}$, $B_d$)=2, the connection point of $B_d$ must precede the c node on the s-t path. This implies the constraint <$I_{x,z}^{s,t}$, $I_{u,v}^{s,t}$> = <{$b_1,b_2$}, {$c_1,c_2$}> which, in turn, uniquely identifies the underlying s-t path as s-a-b-c-t.

Turning now to FIG. 6, illustrated is a pseudocode listing of a COMPUTECONSTRAINTS routine constructed according to the principles of the present invention. As is also clear from the discussion in the example above, it may be impossible to use the disclosed path constraints to infer the complete path topology for a given skeleton path in Q unless some other path(s) in Q have been appropriately refined (e.g., consider $Q_{s,t}$ and $Q_{u,v}$ in the disclosed example).

A challenge at this point stems from the disclosed partial knowledge of the ports that lie in the "single-connection-point" bins used to infer implicit constraints. Thus, the disclosed solution (FIG. 2) needs to employ iterative-refinement passes over all skeleton-paths in Q until no further path refinements are possible.

The Skeleton-Path Refinement Algorithm

Once the disclosed topology-discovery algorithm has computed the set of path constraints S imposed on the $Q_{s,t}$ skeleton path, it invokes the REFINEPATH procedure (step 7 in FIG. 2) to "refine" the ordering of the port-ids in the $P_{s,t}$ set using the newly-discovered constraints. The disclosed REFINEPATH algorithm is a recursive procedure that receives as input the collection of port-ids P along the network path being considered, as well as a collection of path constraints S on the arrangement of those ports. Its output is a skeleton path $Q = <\{U_1, U_2, \ldots, U_K\}>$ over the ports in P that satisfies all the constraints in S. Furthermore, if the constraint collection S uniquely defines the port order for P, every subset $U_i$ in the output path Q comprises a single port in P (i.e., Q defines the complete port order for the considered network path).

Abstractly, the disclosed REFINEPATH algorithm consists of three key steps: (1) mapping the path-constraint collection S to a collection of contiguity constraints R; (2) using R and S to construct an auxiliary skeleton path L; and (3) recursing the refinement process on each subset of the auxiliary skeleton path L to obtain the output skeleton path Q. Intuitively, the set of contiguity constraints R enables segments of port-ids on the target path that are "connected" through the given set of constraints to be identified. These are basically the only (sub) paths for which a complete port order (using the given constraints) can be recovered.

The subsets in the auxiliary skeleton path L are then constructed using the derived contiguity constraints R; the goal here is to ensure that the disclosed refinement algorithm can safely recurse within each individual subset of L while only considering the constraints "local" to this subset. Further, the path constraints in S are used to determine the order of subsets in L. Finally, each subset of L is recursed and the skeleton (sub)paths returned are concatenated to obtain the final skeleton path Q.

In the remainder of this section, the construction of the contiguity constraint set R and the auxiliary skeleton path L will first be described. Then, the disclosed overall REFINEPATH algorithm will be discussed in detail.

The Contiguity Constraint Set R and Connected Port Groups.

The contiguity constraint set R essentially contains all the contiguity constraints that can be directly inferred from the input set of path constraints S. (To simplify the exposition, R is treated as a set of port-id sets, i.e., each $R \in R$ is a set of ports.)

To ensure that R covers all ports in P, singleton constraints are added for each port in P. Excluded from R are the "trivial" contiguity constraints P and ($\phi$). Thus, R is defined:

$R = \{S_i^1, S_i^2, S_i^1 \cup S_i^2 | \forall <S_i^1, S_i^2> \in S\} \cup \{\{k\} | \forall k \in P\} - \{P, \phi\}$ Two sets R, R'$\in$R are said to be "connected" in R if there exists a sequence of sets $R_1 = R, R_2, \ldots, R_k = R'$ in R such that $R_{j-1}$ intersects $R_j$ for every j=2, ..., k. A sub-collection $C \subseteq R$ is called a "connected group" in R if every pair R, R'$\in$C is connected in C and any R$\in$C is not connected with any set in R-C.

$C = \cup_{R \in C} R$, i.e., the union set of the collection C is also defined. It is straightforward to see that the union sets of all connected groups of R are disjoint and form a partition of P. If the path constraints S uniquely determine the arrangement of ports in P, the derived contiguity constraints R satisfy one of the following two conditions: (a) R comprises a single connected group; or, (b) R contains two connected groups $C_1$, $C_2 \subset R$ and S contains the path constraint $<C_1, C_2>$ or $<C_2, C_1>$, where $C_i$ is the union set for group $C_i$.

Intuitively, the above states that, for S to determine a unique arrangement of P, the contiguity and order constraints in S should span the entire set of ports in P. Otherwise, segments of the path would certainly exist where the port arrangement cannot be determined based on the constraints. Note that case above could only arise when $C_1 \cup C_2 = P$, since the (trivial) contiguity constraint P has been excluded from R.

The Auxiliary Skeleton Path L.

Consider a connected group C in R, and let $C \subseteq P$ denote its union set. The goal is to construct a valid port arrangement for the ports in C using the given set of path constraints. Intuitively, the disclosed algorithm accomplishes this by building a (coarse) auxiliary skeleton path $L = <U_1, \ldots, U_{|L|}>$ and then recursing on each subset $U_i$ of L, concatenating the results of the recursive calls.

However, to be able to recurse independently on each $U_i$ subset using only its "local" set of path constraints, this auxiliary skeleton path L needs to be constructed carefully. The construction is based on the concept of intersecting, non-containing (INC) port sets that will now be defined.

Two port sets $R_i, R_j \subset P$ are said to be intersecting, non-containing ("INC") if and only if they intersect and neither one of them contains the other, i.e., $R_i \cap R_j = \phi$, $R_i \not\subseteq R_j$ and $R_j \not\subseteq R_i$. It is easy to see that having a contiguity constraint R in C that is INC with one of the subsets $U_i$ in the skeleton path L essentially means that the $U_i$ subset cannot be independently recursed.

The problem, of course, is that R would also intersect neighbors of $U_i$ in L and the ports in these sets intersected by R cannot be arranged independently since that would not guarantee that R is satisfied in the final (concatenated) arrangement. On the other hand, recursing on $U_i$ is straightforward if R is fully contained in or fully contains $U_i$.

In the former case, R is passed as an argument to the recursive call and in the latter R has no effect on the arrangement of $U_i$ since $U_i$ is already required to be contiguous (by the skeleton path definition). Thus, an auxiliary path L that is INC-free for C should be built as defined below.

The skeleton path $L = <U_1, \ldots, U_{|L|}>$ is said to be "INC-free" for C if and only if for every contiguity constraint $R \in C$ either (a) R is contained in a single $U_j \in L$ (i.e., $R \not\subseteq U_j$, for some j); or (b) R is equal to the union of a (sub)sequence of subsets in L (i.e., $R = \cup^{k_2}_{j=k_1} U_j$ for some $1 \leq k_1 \leq k_2 \leq |L|$).

Figure 7:
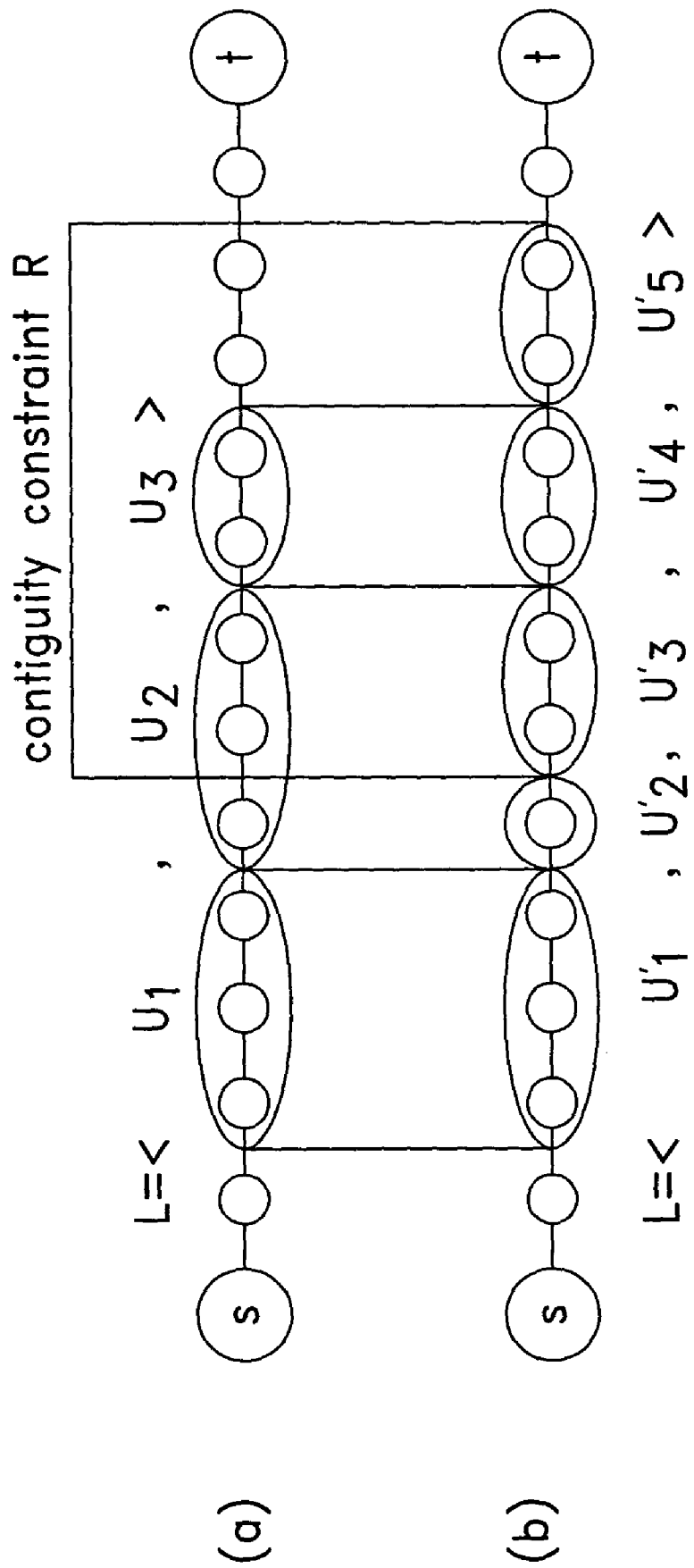
FIGS. 7A and 7B together illustrate exemplary network graphs in which INC-free auxiliary paths are built.

Turning now to FIGS. 7A and 7B, illustrated are exemplary network graphs in which INC-free auxiliary paths are built. One method for building a skeleton path $L = <U_1, \ldots, U_{|L|}>$ that is INC-free for C is as follows. Initially, the largest port set $R_i \in C$ and any set $R_j \in R$ that is INC with $R_i$ are found. Note that two such sets must exist since C is a single connected group and the trivial contiguity constraint C is ignored.

From these two sets, an initial skeleton path with three subsets $R_i - R_j$, $R_i \cap R_j$ and $R_j - R_i$ is constructed. At this point, the orientation of the L path is arbitrary; it is resolved using the given path constraints S after the whole INC-free path has been built.

Let $L = <U_1, \ldots, U_{|L|}>$ denote the current state of the skeleton path and let $P_L$ be the set of all ports in L. While there exists a set $R \in C$ that is INC with $P_L$ or one of the subsets $U_j \in L$ (e.g., FIG. 7A) the disclosed algorithm performs the following operations. First, every $U_j \in L$ that is INC with R is replaced by the two subsets $U_j - R$ and $U_j \cap R$. The order of these two subsets in L is determined as follows.

If $j < |L|$ and R intersects $U_{j+1}$, or $j = |L|$ and R does not intersect $U_{j-1}$, then $U_j - R$ precedes $U_j \cap R$ in L (e.g., the split of $U_2$ into $U_2'$ and $U_3'$ in FIG. 7B). Otherwise, the two subsets are inserted in the opposite order in L. Second, suppose that R and PL are INC; this implies that R contains nodes that are not included in the current skeleton path L.

After the above splitting of $U_j$'s based on R, it is apparent that R must completely contain either the first or the last subset of L. If $U_1 \subset R$, then the set $R - P_L$ is inserted as the first set of L, i.e., $L = <R - P_L> \circ L$ (where "$\circ$" denotes path concatenation); otherwise, L is set equal to $L \circ <R - P_L>$ (e.g., attaching $U_5'$ to L in FIG. 7B). Finally, the set $P_L = P_L \cup R$ is updated and a new contiguity constraint R is selected. Given a single connected group of contiguity constraints $C \subseteq R$, the above-described procedure constructs a skeleton path for C that is INC-free for C.

Remember that the INC-free path L was built without paying attention to its orientation. Thus, at this point, either L or REVERSE(L) is the correct skeleton path for C (where REVERSE is a function that reverses the subset order in a given skeleton path). As will become clear in the description of the disclosed refinement algorithm, the orientation for L is resolved using the input set of path constraints S.

Turning now to FIG. 8, illustrated is a pseudocode listing of a REFINEPATH routine constructed according to the principles of the present invention. In its first phase (steps 2-6), REFINEPATH builds the collection of inferred contiguity constraints R on P and the resulting connected port groups, and decides if S can define a unique port arrangement for P.

If more than two connected groups are discovered, the disclosed algorithm cannot hope to build a skeleton path with ordered subsets of P. Accordingly, it returns the trivial skeleton path L=<P>. If exactly two connected groups (with union sets $C_1$ and $C_2$) are found in R, procedure ORIENTPATH (described in detail below) is invoked to determine the correct ordering of $C_1$ and $C_2$ in the skeleton path using S.

Then, in steps 30-37, the disclosed algorithm recurses on the two union sets $C_1$ and $C_2$ to determine their internal port arrangements and appropriately concatenates the resulting subpaths. Finally, if R comprises a single connected port group, REFINEPATH builds the auxiliary INC-free skeleton path L as described earlier in this section (steps 11-26) and uses the ORIENTPATH procedure to determine the correct orientation for L. Then, again in steps 30-37, REFINEPATH recurses on each (non-singleton) subset $U_j$ in the L path using only the constraints local to that subset (i.e., constraints $<S_i^1, S_i^2> \in S$ such that $S_i^1 \cup S_i^2 \subseteq U_j$) and concatenates the results of the recursive calls to build the final output path Q.

Turning now to FIG. 9, illustrated is a pseudocode listing of an ORIENTPATH routine constructed according to the principles of the present invention. The ORIENTPATH procedure uses the original set of path constraints S to identify the correct direction for an input skeleton path L. ORIENTPATH relies on the two functions FIRST(L, S) and LAST(L, S) introduced above for identifying the index of the first/last occurrence of an element of S in the L path.

More specifically, consider a path constraint $<S_i^1, S_i^2> \in S$ such that FIRST(L, $S_i^1$) < LAST(L, $S_i^2$). Then, since the constraints in S characterize a true network path, the ports in $S_i^1$ should precede those in $S_i^2$ and, thus, L is the correct skeleton path. Similarly, if a path constraint $<S_i^1, S_i^2> \in S$ exists such that FIRST(L, $S_i^2$) < LAST(L, $S_i^1$), the correct path is REVERSE(L)). Otherwise, if no constraint in S can determine the direction of the L path, ORIENTPATH returns a trivial single-set skeleton path.

From the above, it is apparent that the REFINEPATH algorithm returns a feasible skeleton path for the port collection P. Further, if S uniquely defines the port arrangement in P, REFINEPATH will return the (unique) correct path topology.

Inferring the Network Topology

The final step of the disclosed topology-discovery algorithm is to use the data in the resolved skeleton paths to infer the connectivity information for switches and hubs in the underlying network (procedure FINDCONNECTIONS in FIG. 2). Given a set of resolved skeleton paths (i.e., path for which a complete port arrangement has been determined), the procedure for inferring element connectivities is fairly straightforward. Ports that are adjacent on some path are directly connected. If a port has more than one neighbor in the resolved paths, a hub is placed to interconnect that port with all its neighboring ports (as well as all other ports connected to ports already on the hub).

The disclosed topology-discovery algorithm (illustrated in FIG. 2) runs in time that is polynomial in the number of network nodes and is complete for the given AFT and subnet information. That is, if the input SNMP and subnet data is sufficient to uniquely identify the physical topology of the underlying network, then the disclosed algorithm recovers that (unique) topology. This appears to be a significant contribution to the art.

A Sample Execution

Turning now to FIGS. 10A through 10F, illustrated are: (10A) an exemplary true network topology, (10B) initial skeleton paths in the exemplary network graph of FIG. 10A, (10C) skeleton paths in the exemplary network graph of FIG. 10A after a first iteration, (10D) skeleton paths in the exemplary network graph of FIG. 10A after a second iteration, (10E) skeleton paths in the exemplary network graph of FIG. 10A after a third iteration and (10F) resulting physical connections in the exemplary network graph of FIG. 10A.

In this section, some key steps of the disclosed topology-discovery algorithm are presented in inferring the topology of the example network illustrated in FIG. 1A, where it is assumed that the hosts comprise four different subnets $\{s,t\}$, $\{x,y\}$, $\{u,v\}$ and $\{r,q\}$, and each switch a, b, c, d, e belongs to a different subnet. The goal is to demonstrate how the disclosed algorithm accumulates partial topology information during skeleton-path refinement iterations until the complete network topology is recovered.

Let $Q^i$ denote the skeleton-path collection at the end of the i-th iteration ($Q^0$ is the initial set). To simplify the discussion, it is assumed that refinements during the i-th iteration only use skeleton paths in $Q^{i-1}$. The initial skeleton path collection $Q^0Q=\{Q_{s,t}^0, Q_{x,y}^0, Q_{u,v}^0, Q_{r,q}^0\}$ is shown in FIG. 10B. Suppose that the paths are refined in the order $P_{s,t}, P_{x,y}, P_{u,v}, P_{r,q}$. For $Q_{s,t}^0$ collection of path constraints $S_{s,t}^1$ is computed:

$$S_{s,t}^1 = \begin{cases} S_1 = <\{s1\}, \{a1, a2, b1, b2, c1, c2, d1, d2\}>, \\ S_2 = <\{a1, a2, b1, b2, c1, c2, d1, d2\}, \{t1\}>, \\ S_3 = <\{b1, b2, c1, c2, d1, d2,\}, \varphi>, \\ S_4 = <\{b1, b2, c1, c2\}, \varphi>, \\ S_5 = <\{a1, a2, b1, b2\}, \varphi>, \\ S_6 = <\{a1\}, \{a2\}>, S_7 = <\{b1\}, \{b2\}>, \\ S_8 = <\{c1\}, \{c2\}>, S_9 = <\{d1\}, \{d2\}> \end{cases},$$

where $S_1$-$S_5$ follow from the intersections of $Q_{s,t}$ with paths in $Q^0$ (including $Q_{s,t}$ itself), and $S_6$-$S_9$ come from the AFT information at intermediate nodes.

To refine $P_{s,t}$, $S_{s,t}^1$ is used to compute the INC-free auxiliary path $L_{s,t}'=<\{s1\}, \{a1,a2,b1,b2,c1,c2,d1,d2\}, \{t1\}>$ which has the correct orientation (by constraints $S_1$, $S_2$). The subset $U_2=\{a1,a2,b1,b2,c1,c2,d1,d2\} \in L$ is then recursed, and the constraints "local" to $U_2$ (i.e., $S_3$-$S_5$) are used to compute the subpath $L'=<\{a1,a2\}, \{b1,b2\}, \{c1,c2\}, \{d1,d1\}>$.

Unfortunately, at this point, ORIENTPATH cannot use the input constraints to determine the correct direction for L', so it returns the set $U_2$, which means that the skeleton path returned by REFINEPATH is exactly the same as $Q_{s,t}^0$.

Next, for $Q_{x,y}^0$, the path constraints $S_{x,y}^1$ are computed:

$$S_{x,y}^1 = \begin{cases} S_1 = <\{x1\}, \{b1, b2, c1, c2, d1, d2, e2, e1\}>, \\ S_2 = <\{b1, b2, c1, c2, d1, d2, e1, e1\}, \{y1\}>, \\ S_3 = <\{b1, b2, c1, c2, d1, d2,\}, \varphi>, \\ S_4 = <\{b1, b2, c1, c2, e1\}, \varphi>, \\ S_5 = <\{b1, b2\}, \varphi>, \\ S_6 = <\{b1\}, \{b2\}>, S_7 = <\{c1\}, \{c2\}>, \\ S_8 = <\{d1\}, \{d2\}>, S_9 = <\{e2\}, \{e1\}> \end{cases},$$

To refine $P_{x,y}$, REFINEPATH computes the INC-free auxiliary path $L_{x,y}=<\{x1\}, \{b1,b2,c1,c2,d1,d2,e2,e1\}, \{y1\}>$, and recurses to refine its second subset $U_2=<\{b1,b2,c1,c2,d1,d2, e2,e1\}> \in L_{x,y}$. Using constraints $S_3$, $S_4$, $S_5$, and $S_9$, it computes the subpath $L'=\{d1,d2\}, \{b1,b2,c1,c2\}, \{d1,d2\}>$. Then, by constraint $S_9$, ORIENTPATH concludes the reverse direction for L', returning the final subpath $<\{e2\}, \{e1\}, \{b1, b2,c1,c2\}, \{d1,d2\}>$.

Additional recursive calls resolve the port order for subset $\{d1,d2\}$ but not for subset $\{b1,b2,c1,c2\}$; thus, the final x-y skeleton path returned is $Q_{x,y}^1=<\{e2\}, \{e1\}, \{b1,b2,c1,c2\}, \{d1,d2\}>$. The other two refined skeleton paths $Q_{u,v}^1$ and $Q_{r,q}^1$ are computed similarly, and the path collection $Q^1$ is shown in FIG. 10C.

Note that, after the first refinement iteration, none of the paths in $Q^1$ specifies a complete arrangement. However, as will now be shown, the refined path $Q_{x,y}^1 \in Q^1\}$ allows $Q_{s,t}$ to be refined in the second iteration of the disclosed algorithm.

Consider the set of path constraints $S_{s,t}^2$ computed for $Q_{s,t}$ during the second iteration. This set is identical to $S_{s,t}^1$ with the exception of constraint $S_3$ (resulting from the projection of $Q_{x,y}$ onto $Q_{s,t}$); more specifically, constraint $S_3$ for this second iteration over $Q_{s,t}$ is $S_3 => \{b1,b2,c1,c2\}, \{d1,d2\}$. Thus, after REFINEPATH recomputes the subpath $L'=<\{a1,a2\}$, $\{b1,b2\}, \{c1,c2\}, \{d1,d2\}>$, ORIENTPATH can now use constraint $S_3$ to determine the correct direction for L'. The resulting s-t skeleton path returned is $Q_{s,t}^2=<\{s1\}, \{a1\}, \{a2\}, \{b1\}, \{b2\}, \{c1\}, \{c2\}, \{d1\}, \{d2\}, \{t1\}>$ (FIG. 10D)

In its third iteration, the topology-discovery algorithm actually recovers the complete port arrangement for all skeleton paths as shown in FIG. 10E. Finally, the FINDCONNECTIONS procedure uses the resolved paths to discover the element connectivities illustrated in FIG. 10F. It is apparent that the connections discovered specify exactly the true network topology shown in FIG. 10A.

Figure 11:
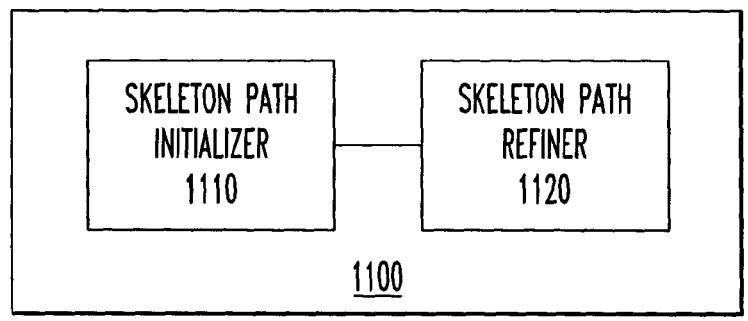
FIG. 11 illustrates a block diagram of a system for determining a physical topology of a network having multiple subnets constructed according to the principles of the present invention.

Turning now to FIG. 11, illustrated is a block diagram of a system for determining a physical topology of a network having multiple subnets constructed according to the principles of the present invention.

The system, generally designated 1100, is illustrated as including a skeleton path initializer 1110. The skeleton path initializer 1110 uses addressing information (such as AFT information) from elements (such as routers and hubs) in the network to develop a collection of skeleton paths of direct physical connections between labeled ones of the elements. Because the system 1100 is designed to accommodate networks having multiple subnets, the skeleton paths traverse multiple ones of the subnets. In the illustrated embodiment, the skeleton path initializer 1110 performs the functions contained in the INITSKELETONPATH procedure, which has been described in detail above.

The system 1100 is further illustrated as including a skeleton path refiner 1120. The skeleton path refiner 1120 is associated with the skeleton path initializer 1110 and refines the collection by inferring, from the direct physical connections and path constraints derived therefrom, other physical connections in the skeleton paths involving unlabeled ones of the elements. In the illustrated embodiment, the skeleton path initializer 1110 performs the functions contained in the REFINEPATH procedure, which has been described in detail above. It should be understood that the skeleton path initializer 1110 and the skeleton path refiner 1120 may operate iteratively to initialize and refine skeleton paths in the network (initialized skeleton paths are refined, giving rise to the opportunity to initialize further skeleton paths).

The skeleton path refiner 1120 may perform additional functions as well. The skeleton path refiner 1120 may iteratively refine the collection until at least one of the skeleton paths consists of singletons. The skeleton path refiner 1120 may further iteratively refine the collection until all of the skeleton paths that can be fully resolved consist of singletons. The constraints that are considered during refinement may consist solely of explicit constraints, or may also include implicit constraints. In the latter case, the constraints may be determined according to the COMPUTECONSTRAINTS procedure, which has been described in detail above. Finally, the skeleton path refiner 1120 may use the resolved paths may use the resolved paths to discover the element connectivities as per the FINDCONNECTIONS procedure, which has been described in detail above.

Figure 12:
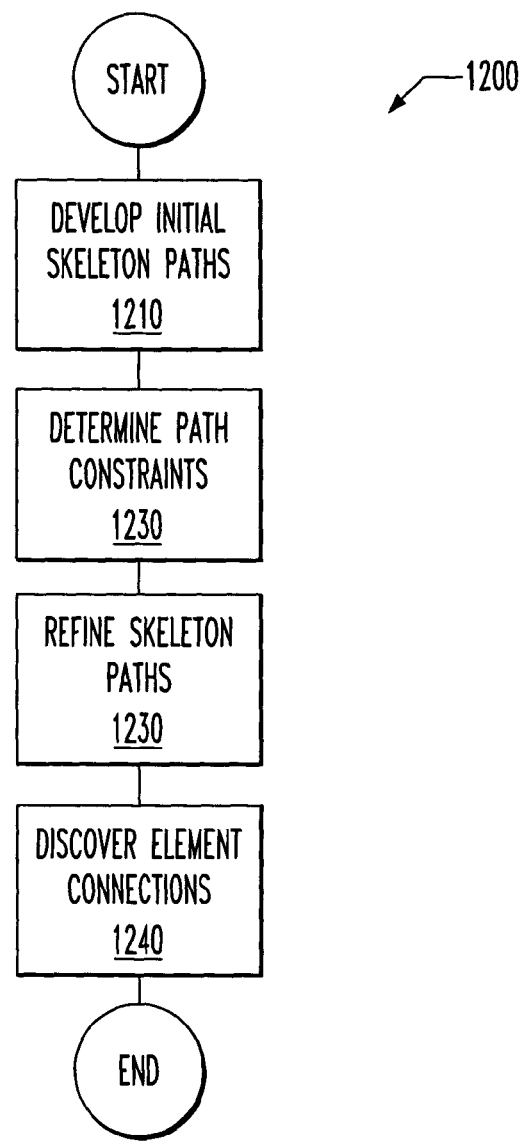
FIG. 12 illustrates a block diagram of a method of determining a physical topology of a network having multiple subnets carried out according to the principles of the present invention.

Turning now to FIG. 12, illustrated is a block diagram of a method of determining a physical topology of a network having multiple subnets carried out according to the principles of the present invention. The method, generally designated 1200, is invoked when the ISO layer-2 topology of an unknown network is desired to be determined. The method 1200 includes a step 1210 in which addressing information from elements in the network is used to develop a collection of skeleton paths of direct physical connections between labeled ones of the elements. As above, the skeleton paths traverse multiple of the subnets.

Next, in a step 1220, explicit and implicit path constraints are determined for the collection of skeleton paths. Then, in a step 1230, the collection of skeleton paths is refined by inferring, from the direct physical connections and path constraints derived therefrom, other physical connections in the skeleton paths involving unlabeled ones of the elements. Finally, in a step 1240, the resolved paths are used to discover the element connectivities. The result is an accurate, layer-2 representation of the network that finds substantial utility in diagnosing problems that may occur from time to time in the network.

From the above, it is apparent that the present invention provides the first complete algorithmic solution for discovering the physical topology of a large, heterogeneous network (typically an Ethernet network) comprising multiple subnets and perhaps dumb or uncooperative network elements. The disclosed algorithm that represents one embodiment of the present invention relies on standard SNMP MIB information that is widely supported in modern IP networks and is the first SNMP-based topology-discovery tool to offer strong completeness guarantees for recovering the true network topology from the given MIB data.

Although the present invention has been described in detail, those skilled in the art should understand that they can make various changes, substitutions and alterations herein without departing from the spirit and scope of the invention in its broadest form.

What is claimed is:

1. A system for determining a physical topology of a network having multiple subnets, comprising:
    a skeleton path initializer that uses addressing information from elements in said network to develop a collection of skeleton paths of direct physical connections between labeled ones of said elements, said skeleton paths traversing multiple of said subnets; and
    a skeleton path refiner, coupled to said skeleton path initializer, that refines said collection of skeleton paths by inferring, from said direct physical connections and path constraints derived therefrom, other physical connections in said skeleton paths involving unlabeled ones of said elements, wherein said unlabeled ones are not included in said addressing information, wherein a skeleton path from node s to node t in a graph G representing a connective topology of said network is defined as a sequence $Q_{s,t}=<U_1, U_2, \ldots, U_K>$ of non-empty port-id sets $U_1, \ldots, U_K$ forming a partition of the set of port-ids $P_{s,t}(U_i \cap U_j = \phi, \cup_i U_i = P_{s,t})$ such that: (1) each $U_j$ contains the port-ids of a contiguous segment of the s-t path; and, (2) for each i<j, all the port-ids in $U_i$ precede those in $U_j$ on the s-t path.

2. The system as recited in claim 1 wherein said skeleton path refiner iteratively refines said collection until at least one of said skeleton paths consists of singletons.

3. The system as recited in claim 1 wherein said constraints are selected from the group consisting of:
    explicit constraints, and
    implicit constraints.

4. The system as recited in claim 1 wherein said skeleton path refiner refines said collection by creating a map between said path constraints and contiguity constraints, constructing an auxiliary skeleton path from said map, recursing on each subset of said auxiliary skeleton path to obtain output skeleton subpaths and concatenating the output skeleton subpaths to obtain a final skeleton path.

5. The system as recited in claim 1 wherein said skeleton path refiner further determines an orientation of at least some of said skeleton paths.

6. The system as recited in claim 1 further comprising a connection finder, associated with said skeleton path refiner, that infers connectivity as among adjacent ports on said skeleton paths.

7. The system as recited in claim 1 wherein said network is an Ethernet network and said addressing information is contained in address forwarding tables associated with said labeled ones of said elements.

8. A method of determining a physical topology of a network having multiple subnets, comprising:
    using addressing information from elements in said network to develop a collection of skeleton paths of direct physical connections between labeled ones of said elements, said skeleton paths traversing multiple of said subnets, wherein a skeleton path from node s to node t in a graph G representing a connective topology of said network is defined as a sequence $Q_{s,t}=<U_1, U_2, \ldots, U_K>$ of non-empty port-id sets $U_1, \ldots, U_K$ forming a partition of the set of port-ids $P_{s,t}(U_i \cap U_j = \phi, \cup_i U_i = P_{s,t})$ such that:
(1) each $U_j$ contains the port-ids of a contiguous segment of the s-t path; and, (2) for each i<j, all the port-ids in $U_i$ precede those in $U_j$ on the s-t path; and refining said collection of skeleton paths by inferring, from said direct physical connections and path constraints derived therefrom, other physical connections in said skeleton paths involving unlabeled ones of said elements that are not included in said addressing information.

9. The method as recited in claim 8 wherein said refining includes iteratively refining said collection until at least one of said skeleton paths consists of singletons.

10. The method as recited in claim 8 wherein said constraints are selected from the group consisting of:
explicit constraints, and
implicit constraints.

11. The method as recited in claim 8 wherein said refining includes creating a map between said path constraints and contiguity constraints, constructing an auxiliary skeleton path from said map, recursing on each subset of said auxiliary skeleton path to obtain output skeleton subpaths and concatenating the output skeleton subpaths to obtain a final skeleton path.

12. The method as recited in claim 8 wherein said refining further includes orientating at least some of said skeleton paths.

13. The method as recited in claim 8 further comprising inferring connectivity as among adjacent ports on said skeleton paths.

14. A system for determining a physical topology of an Ethernet network having multiple subnets, comprising:
a skeleton path initializer that uses address forwarding information from elements in said network to develop a collection of skeleton paths of direct physical connections between labeled ones of said elements, said skeleton paths traversing multiple of said subnets; and
a skeleton path refiner, coupled to said skeleton path initializer, that refines said collection of skeleton paths by inferring, from said direct physical connections and explicit and implicit path constraints derived therefrom, other physical connections in said skeleton paths involving unlabeled ones of said elements, wherein said unlabeled ones are not included in said address forwarding information, wherein a skeleton path from node s to node t in a graph G representing a connective topology of said network is defined as a sequence $Q_{s,t} = <U_1, U_2, \ldots, U_K>$ of non-empty port-id sets $U_1, \ldots, U_K$ forming a partition of the set of port-ids $P_{s,t}(U_i \cap U_j = \phi, \cup_i U_i = P_{s,t})$ such that: (1) each $U_j$ contains the port-ids of a contiguous segment of the s-t path; and, (2) for each i<j, all the port-ids in $U_i$ precede those in $U_j$ on the s-t path.

15. The system as recited in claim 14 wherein said skeleton path refiner iteratively refines said collection until at least one of said skeleton paths consists of singletons.

16. The system as recited in claim 14 wherein said skeleton path refiner refines said collection by creating a map between said path constraints and contiguity constraints, constructing an auxiliary skeleton path from said map, recursing on each subset of said auxiliary skeleton path to obtain output skeleton subpaths and concatenating the output skeleton subpaths to obtain a final skeleton path.

17. The system as recited in claim 14 wherein said skeleton path refiner further determines an orientation of at least some of said skeleton paths.

18. The system as recited in claim 14 further comprising a connection finder, associated with said skeleton path refiner, that infers connectivity as among adjacent ports on said skeleton paths.

19. The system as recited in claim 14 wherein said skeleton path initializer and said skeleton path refiner are embodied in sequences of software instructions executable in a general purpose computer.

20. The system as recited in claim 14 wherein said skeleton path initializer is embodied in an InitSkeletonPaths routine, said skeleton path refiner is embodied in a RefinePath routine and said system further comprises ComputeConstraint and FindConnections routines.

* * * * *